United States Patent [19]
Sagar et al.

[11] Patent Number: 6,064,390
[45] Date of Patent: *May 16, 2000

[54] APPARATUS AND METHOD FOR REPRESENTATION OF EXPRESSION IN A TISSUE-LIKE SYSTEM

[75] Inventors: Mark A. Sagar, Somerville; Ivan Gulas, Wellesley, both of Mass.

[73] Assignee: Lifef/x Networks, Inc., Hollywood, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/900,893

[22] Filed: Jul. 25, 1997

Related U.S. Application Data

[60] Provisional application No. 60/022,716, Jul. 26, 1996.

[51] Int. Cl.[7] .................................................. G06R 9/00
[52] U.S. Cl. ............................................ 345/420; 345/425
[58] Field of Search .................................. 345/420, 441, 345/442, 472, 473, 474, 425

[56] References Cited

U.S. PATENT DOCUMENTS 5,867,588  2/1999  Marquardt ................................ 345/425

OTHER PUBLICATIONS

Chen, David T., et al., "Pump it Up: Computer Animation of a Biomechanically Based Model of Muscle Using the Finite Element Method," ACM SIGGRAPH, Jul. 1992.

Essa,Irfan, List of References, Feb. 11, 1996, pp. 1–11.

Karla, Prem et al., "Simulation of Facial Muscle Actions Based on Rational Free Form Deformation," Eurographics '92, The European Association for Computer Graphics, 13th Annual Conference and Exhibition, Cambridge –UK, Sept. 7–11, 1992, vol. II, No. 3, pp. C–59 –C69.

Lee, Yuencheng, et al., "Realistic Modeling for Facial Animation," Computer Graphics Proceedings, Annual Conference Series, Los Angeles, CA, Aug. 6–11, 1995, pp. 55–62.

Pieper, Steven, et al., "Interactive Graphics for Plastic Surgery: A Task–Level Analysis and Implementation," 1992 Symposium on Interactive 3D Graphics, Cambridge, MA, Mar. 29–Apr. 1, 1992, pp. 127–134.

Sagar, Mark Andrew, "Creating Anatomic Models for Bioengineering Virtual Environments," Thesis, Department of Mechanical Engineering, The University of Auckland, New Zealand, Jan. 1996, pp. 1–198.

Terzopoulos, Demetri, et al. "Analysis and Synthesis of Facial Image Sequences Using Physical and Anatomical Models," IEEE Transactions on Pattern Analysis and Machines Intelligence, vol. 15, No. 6, Jun. 1993, pp. 569–579.

Waters, K, et al., List of Publications by Waters & Terzopoules, Jul. 3, 1997, pp. 1–2.

Waters, Keith, "A Muscle Model for Animating Three–Dimensional Facial Expression," Computer Graphics, vol. 21, No. 4, Jul. 1987, pp. 17–23.

*Primary Examiner*—Mark R. Powell
*Assistant Examiner*—Huedung X. Cao
*Attorney, Agent, or Firm*—Bromberg & Sunstein LLP

[57] ABSTRACT

An apparatus and method for representing expression in a tissue-like system, that may include a human face, where the system is particularized to a specified individual. A graphical representation generator implemented in a computer determines a representation, in terms of a finite-element model, of the surface of the tissue of the system, providing a graphic output defining the surface in world coordinates. An expressive detail generator, including a wrinkle generator, modifies the surface determined by the graphical representation generator before the surface has been mapped into world coordinates in accordance with three-dimensional features of the tissue-like system of a particular subject.

7 Claims, 7 Drawing Sheets

FIG. 5A
REST

DEFORMATION
FIG. 7

FIG. 8

GRAPHICAL VOLUME REPRESENTATION
OF TISSUE ALTERED

APPARATUS AND METHOD FOR REPRESENTATION OF EXPRESSION IN A TISSUE-LIKE SYSTEM

The present application claims priority from U.S. provisional application No. 60/022,716, filed Jul. 26, 1996, which is herein incorporated by reference.

TECHNICAL FIELD

The present invention relates to devices and methods for animation of images and objects and for modeling of animate expression.

BACKGROUND ART

The state of the art, in the rendering by visual artists, of human expression is set forth in Gary Fagin, *The Artist's Complete Guide to Facial Expression,* Watson-Guptill Publications, New York 1990 (hereinafter referred to as "Fagin"). The state of the art in computer animation of faces is set forth in F. Parke and K. Waters, *Computer Facial Animation,* A. K. Peters, Wellesley, Mass. (1996) (hereinafter referred to as "Parke et al.") and in the references cited therein. The foregoing references are hereby incorporated herein by reference.

The present state of computer animation has now enabled the representation of gross expression gestures, but not the convincing representation of human expression that is mastered implicitly by visual artists such as taught in Fagin.

SUMMARY OF THE INVENTION

The present invention provides in a preferred embodiment an apparatus for representing expression in a particular tissue-like system that may include a human face. The apparatus of this embodiment includes a finite-element model of a tissue-like system implemented in a computer. The model has a data input for parameter values defining tissue properties for the particular system; a command input for identifying an expression to be represented; and a finite-element output specifying field values, associated with tissue of the system, in finite-element coordinates. The apparatus of this embodiment also includes a graphical representation generator, implemented in a computer and coupled to the finite-element output, for determining a surface of tissue of the system and providing a graphic output defining the surface in world coordinates. Finally the apparatus has an expressive detail generator, implemented in a computer and coupled to the finite-element output, for generating expressive detail by modifying the surface determined by the graphical representation generator, wherein the expressive detail generator employs an anisotropic model of tissue.

In a further embodiment, the finite-element model, the graphic representation generator, and the expressive detail generator are configured to provide time-varying outputs so that the graphic output represents an expression that is time-dependant. In addition, the expressive detail generator includes a wrinkle generator.

In still a further embodiment, the graphical representation generator includes an arrangement for determining the surface of tissue initially in finite-element coordinates and an arrangement for mapping the surface so determined into world coordinates. In this case the wrinkle generator may be implemented to include an arrangement for computing a field of a strain-related quantity for each of a plurality of finite elements based on the finite-element output and an arrangement for modifying the surface of tissue as computed in the graphical representation generator in finite-element coordinates before the surface has been mapped into world coordinates.

In an alternative embodiment, the apparatus of this embodiment includes a finite-element model of a tissue-like system implemented in a computer, but the finite-element model itself includes the capability for expression generation. The model has a data input for parameter values defining tissue properties for the particular system; a command input for identifying an expression to be represented; and a finite-element output specifying field values, associated with tissue of the system, in finite-element coordinates. The model also has an arrangement providing a volumetric and anisotropic model of tissue that includes computation of a field of a strain-related quantity for each of a plurality of finite elements, configured so that tissue deformation may result in wrinkles associated with the strain-related quantity. Finally, the apparatus of this embodiment includes a graphical representation generator, implemented in a computer and coupled to the finite-element output, for determining an surface of tissue of the system and providing a graphic output defining the surface in world coordinates.

In accordance with a further aspect of the present invention, there is provided a method for representing expression in a tissue-like system pertaining to a particular subject. The method has the steps of generating a volumetric finite element mesh of the tissue-like system, the volumetric finite element mesh having elements and containing multiple fields of parameters definable across the elements including a height field, measuring three-dimensional features of the particular subject, fitting the volumetric finite element mesh to the three-dimensional features of the particular subject in terms of a fiber coordinate system, calculating a wrinkle map characterizing the particular subject and having wrinkles, isolating positions of the wrinkles into height fields of the finite element mesh, converting tissue compression based on command data or stored data to the fiber coordinate system, and calculating displacement magnitudes of the height field. In accordance with another embodiment of the invention, the method may also include the step of displaying the calculated displacement magnitudes.

BRIEF DESCRIPTION OF THE DRAWINGS

The invention will be more readily understood by reference to the following drawings, taken with the accompanying detailed description, in which.

DETAILED DESCRIPTION OF SPECIFIC EMBODIMENTS

Through the work of Peter J. Hunter (Department of Engineering Science, The University of Auckland, Auckland, New Zealand) and others, it is now known how to achieve sophisticated finite-element modeling of tissue-like systems. The Hunter system uses finite element analysis—employing volumetric elements—and (i) involves high-order elements (cubic Hermite functions), (ii) recognizes non-linear and large deformations, (iii) recognizes anisotropic material properties of tissue, and (iv) has the ability to describe multiple fields of data types. Nevertheless, even less sophisticated modeling systems, such as taught by Parke et al., are pertinent to the invention described herein. Furthermore, it is known how to transform finite element data into graphical representation of tissue. See the work of the inventor here, Mark A. Sagar, *Creating Virtual Anatomy for Bioengineering Virtual Environments*, Ph.D. Thesis, The University of Auckland, Auckland, New Zealand, 1996 (hereinafter referred to as "Sagar"), a copy of which is attached to U.S. Provisional Application No. 60/022,716 from which this application claims priority, and is hereby incorporated herein by reference. A discussion of the work at the University of Auckland by Peter J. Hunter et al. appears on p. 43 of Sagar.

Figure 1:
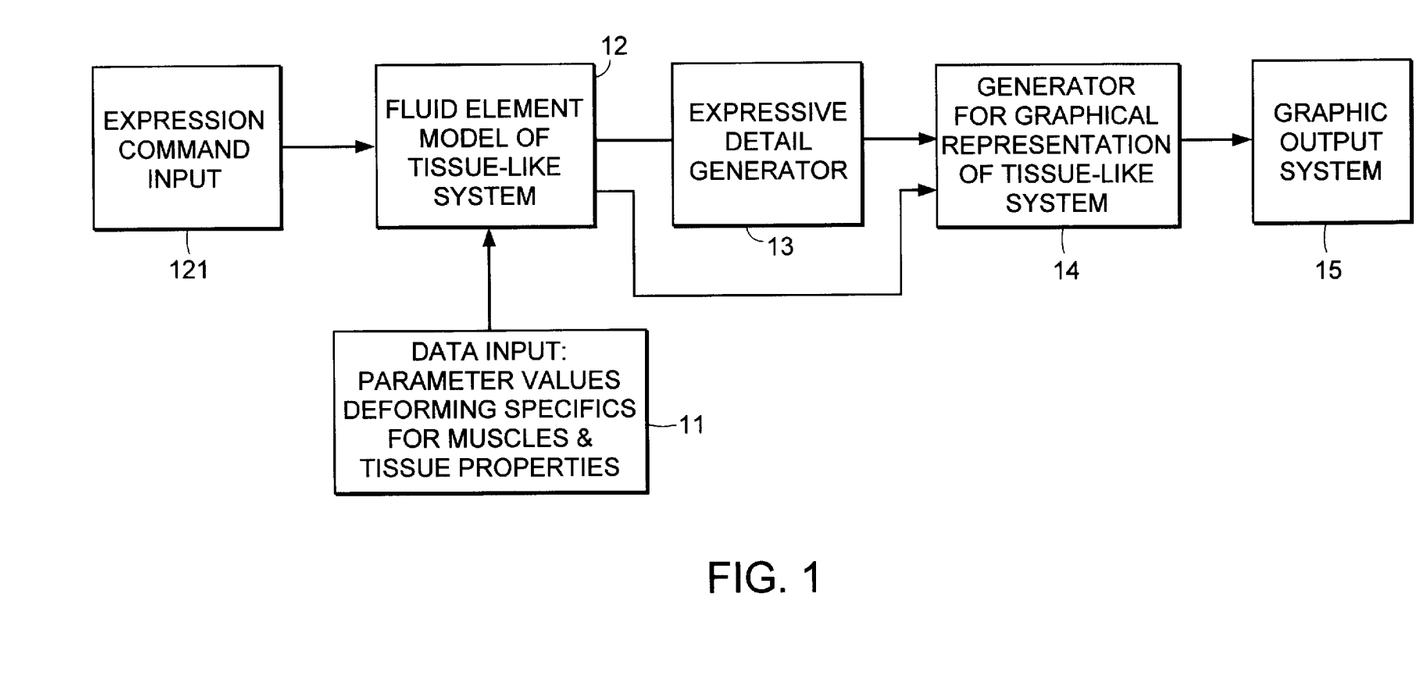
FIG. 1 is a block diagram of a preferred embodiment of an apparatus in accordance with the present invention.

In FIG. 1. can be seen a finite element model 12 of a tissue-like system. Any of a range of suitable models may be employed including models disclosed in Parke et al. Alternatively and preferably the model may utilize the approach of Peter Hunter described above. The model 12 includes a data input 11 that provides parameter values that define tissue properties for the particular tissue-like system in which expression is being represented. The term "tissue-like" is intended to include systems like the human face in which expression is expected, as well as other animals, and even normally inanimate objects that are the subject of animation. In the last category are included objects of every kind that may be the subject of animation for entertainment purposes, although the category is not limited to such objects. Textiles, clothing, and anatomical parts, generally, may be simulated and animated within the scope of this invention and the appended claims, though these are given solely as representative examples of the application of the invention as taught herein and as claimed in the appended claims.

The term "tissue properties" is intended to include properties of both muscles (including specific geometrical configurations) and other tissue, including skin. There are a wide-range of sources for this data. Whereas the finite element model 12 is based, for example, in the case of a face, on anatomical knowledge generally, as well as the three-dimensional geometry and mechanical properties of skin, the data input 211 provides details that particularize the model to relate to a specific individual, or are at least capable of particularizing the model. Accordingly, the data input 211 may be provided by measurement directly of a human or other subject. Alternatively, or in addition, parameter values may be created entirely or partially in order to establish a fictitious tissue-like system. The finite element model 12 also includes an expression command input 121 to identify the expression that is to be represented. The input may be furnished directly by an artist seeking to produce an animation, but it also may be developed empirically by measurement of an actual subject.

In the case where the data input 11 and the expression command input 121 are developed by measurement, it will be appreciated that it is possible to use the present invention for video compression. Consider, for example, a situation in which the recipient of information has already stored the finite element model 12 and the parameter values defining a particular individual in accordance with the input 11. Then there need be supplied only the expression command input 121 to permit the recipient of the information to be able to generate a representation for the expression using the techniques described herein.

Figure 2:
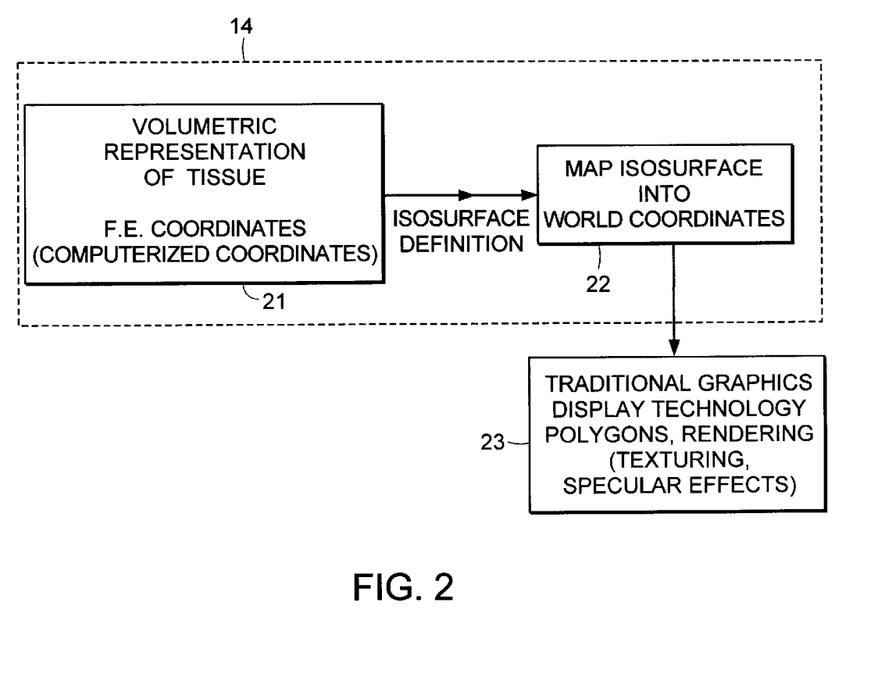
FIG. 2 is a block diagram showing principally further detail of the graphic representation generator 14 of FIG. 1.

In any event, however, once the inputs have been supplied to the finite element model 12, the output of the finite element model is used in two ways. First the output is coupled to the generator 14 for graphical representation of the tissue-like system. This graphical representation generator is implemented in a computer and determines an surface of tissue of the system which may, in some embodiments, be an isosurface. The surface may be referred to, without limitation, as an isosurface. As shown in FIG. 2, the graphical representation generator 21 includes first an arrangement for producing a volumetric representation of the tissue. In this step the volumes are modeled in finite element material coordinates, so that volumes deform with the biomechanically-based finite element tissue model 12. This volumetric representation of tissue produces an isosurface definition that in item 22 is mapped into world coordinates. The term "world" coordinates means in the present description and claims any coordinate system that is external to the coordinate system of a particular finite element. Once the isosurface has been mapped into world coordinates, it is capable of being subject to traditional graphics display technology in accordance with the steps shown in item 23. Such technology includes polygon processing and rendering (including texturing and specular effects). The graphic output system 15 shown in FIG. 1 is intended to include this traditional graphics display technology as well as three-dimensional modeling, including animation of a three-dimensional object showing the expression being represented.

The graphical representation generator 14 is configured in accordance with the Sagar reference. The advantage of this approach is that not only do the volumes deform with the biomechanically-based finite element tissue models, but also attributes such as textures are linked with material points and deformed correctly with volumes.

In accordance with the invention, the elements of the finite element models may entail basis functions of varying order, and, in a preferred embodiment, are bi-cubic Hermite functions in the plane of the surface and linear functions in the normal direction. Functions of C1 continuity which span the three-dimensional space may be employed.

Also coupled to the output of the finite element model 12 is expressive detail generator 13. The expressive detail generator 13 is used to modify the geometric representation of tissue achieved by the graphical representation generator 14.

Figure 3:
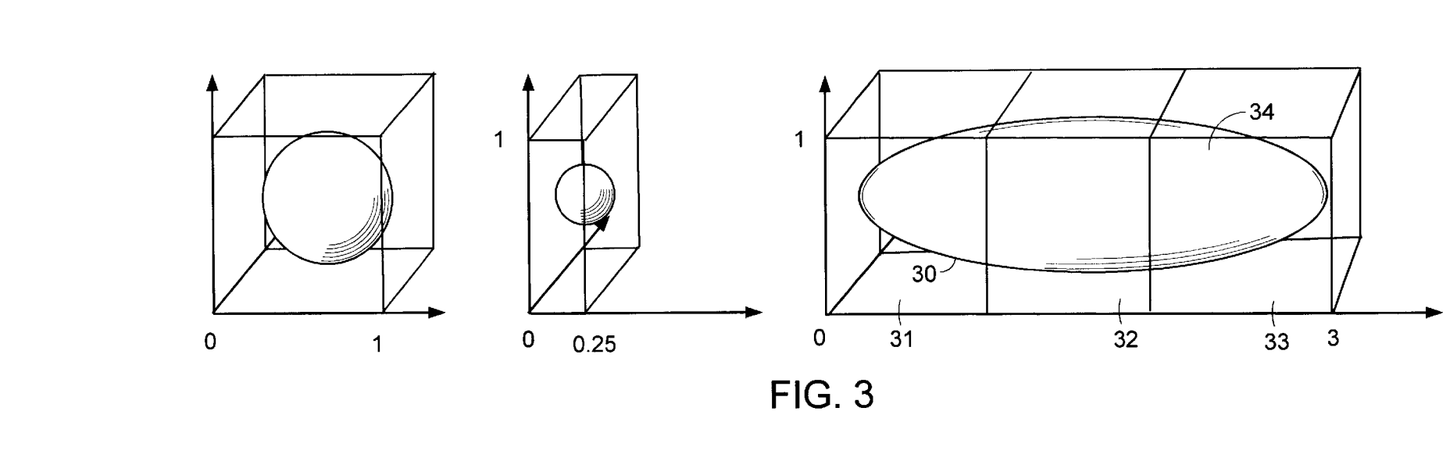
FIGS. 3 and 4 provide an illustration of finite-element mapping as used in the apparatus.
Figure 4:
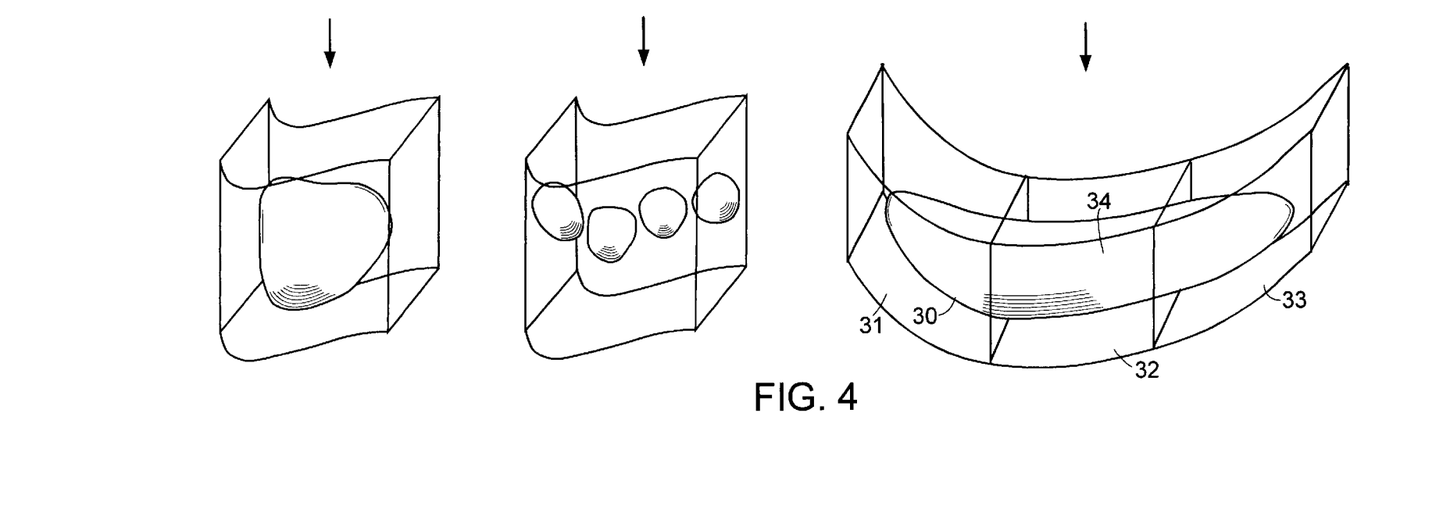

The method by which this modification is achieved is best understood by first referring to the volumetric finite element model used in this embodiment. In FIG. 3 are shown finite elements 31, 32, and 33 in which is located a body 34 of tissue. If, as a result of deformation, the elements 31, 32, and 33 are deformed, nevertheless, absent other circumstances, it is possible that a point 30 on the body 34 may keep the same relative location in finite element coordinates in element 31 both before the deformation as shown in FIG. 3 and after the deformation as shown in FIG. 4. Accordingly, in accordance with the embodiment of FIG. 1, the expressive detail generator operates by first computing a strain field relative to the skin fiber direction for each finite element that involves expression in the tissue-like system.

Figure 5A:
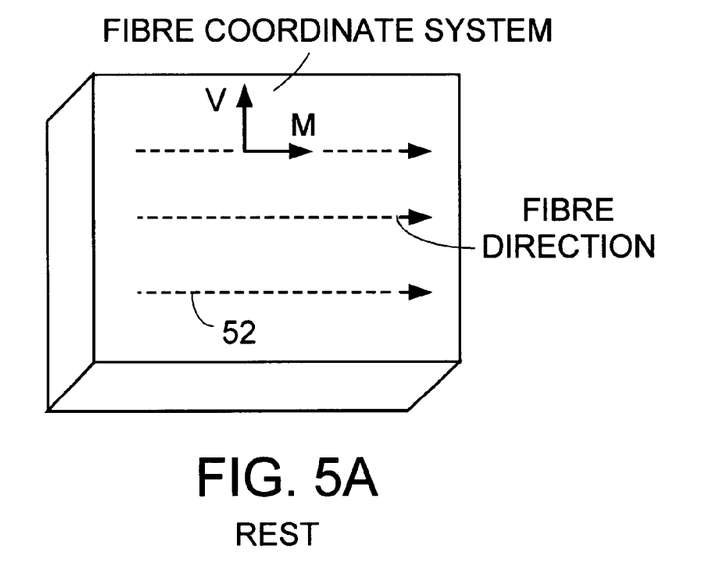
FIG. 5A shows the fiber directions of the fiber coordinate system in a rest condition.
Figure 5B:
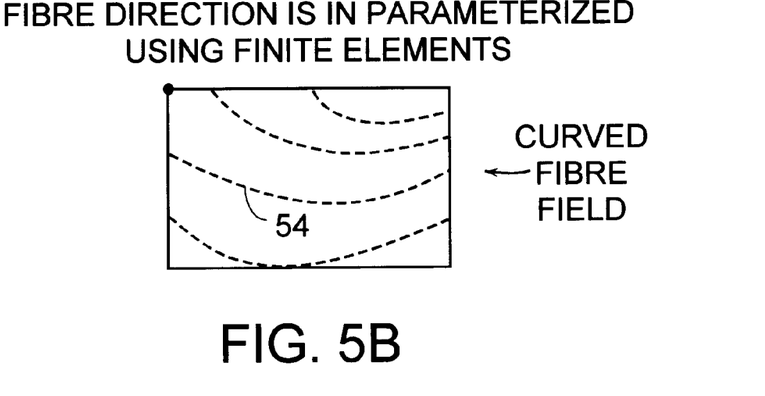
FIG. 5B shows the fiber directions of the general fiber coordinate system in a rest condition.

The fiber coordinate system is shown in FIG. 5A, with inferred fiber directions indicated by dashed lines 52. The fiber directions correspond, conceptually, to collagen directions in the skin and are unique to each individual person, giving rise to characteristic crease lines and wrinkles. Fiber directions 52 of FIG. 5A are indicated at rest relative to deformations which are discussed in greater detail below. Additionally, fiber directions are generally neither rectilinear nor parallel, as shown, by way of example only, in FIG. 5A. More generally, the fiber directions giving rise to a "fiber field" are curved, as shown by dashed lines 54 in FIG. 5B, and are represented via a finite element parametrization. (As an alternative to computation of the strain field, it is possible to compute some other quantity related to strain, such as stress, and use the result in a manner analogous to the manner discussed herein.) After computation of the strain field, strains are computed for these elements. Finally, these values are used as the basis for modifying the volumetric representation of tissue.

Figures 6, 7, 8:
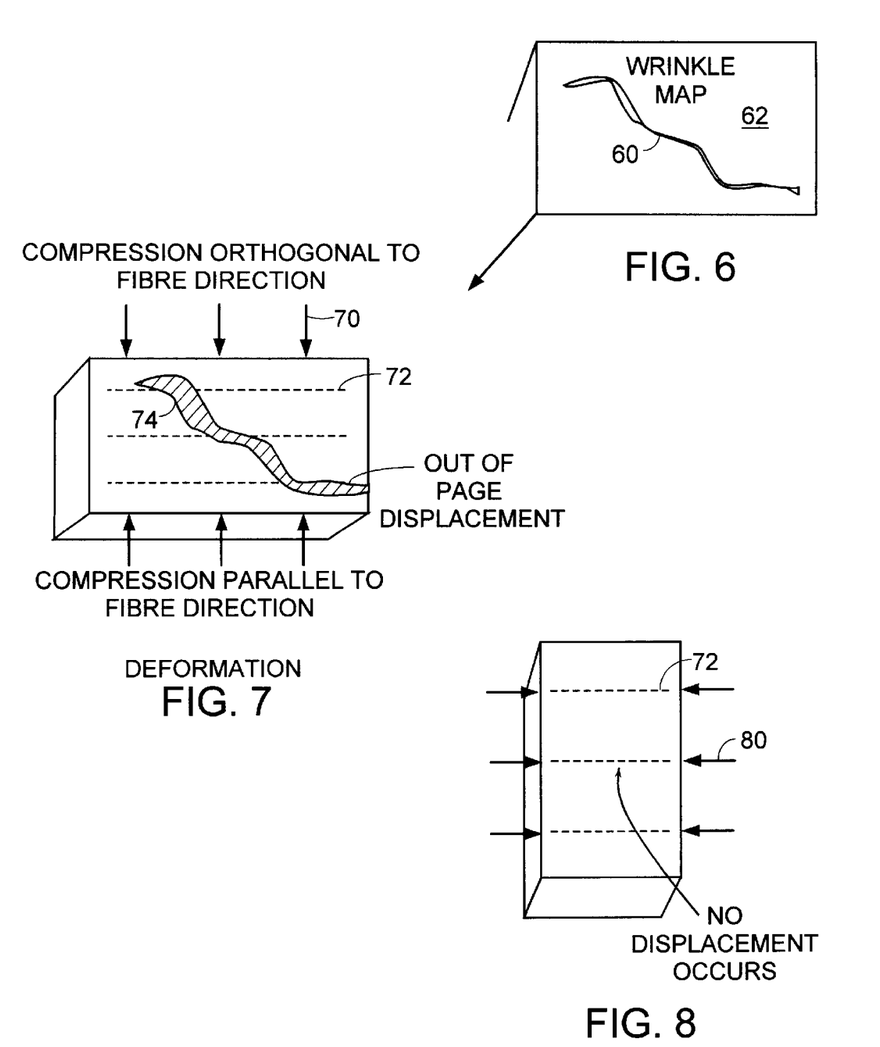
FIG. 6 shows a wrinkle of a wrinkle map, in accordance with an embodiment of the present invention.
FIGS. 7 and 8 illustrate operation of the expressive detail generator as a computational process to generate wrinkles.
Figure 9:
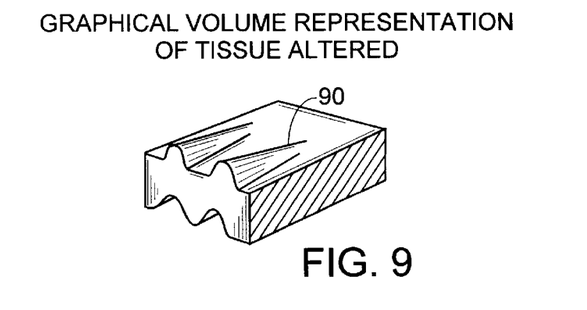
FIG. 9 is a graphical volume representation in perspective view of the tissue altered to represent wrinkles in accordance with an embodiment of the present invention.

Based on information derived with respect to a particular subject to be modeled, a wrinkle map is stored which embodies the crease lines characterizing expressive movements of the face, for example, associated with that subject. A section of a wrinkle map is represented pictorially in FIG. 6 where curve 60 represents a wrinkle in skin 62. The wrinkle is generated by modifying the volumetric representation of tissue as described in the Sagar reference. In particular, the volumetric representation is modified, so that the wrinkles generally follow the stress contours. More particularly, referring to FIG. 7, compression of the skin in a direction 70 locally orthogonal to fiber direction 72 is shown to create wrinkle 74 as a displacement in height (in the direction out of the page), whereas, as shown in FIG. 8, compression of the skin in a direction 80 parallel to fiber direction 72 causes no such deformation. FIG. 9 depicts a perspective representation of skin 62 altered to form a volumetric wrinkle 90 in accordance with the teaching of this invention. A wrinkle is manifested in the volumetric representation as a local change in the position of the isosurface. Once the position of the isosurface has changed, specular effects, such as shadow detail and coloration, can be realized simply as a result of the graphic technology being utilized in accordance with item 23 of FIG. 2. It should be borne in mind that in accordance with this embodiment, the graphical representation of tissue can have dramatically greater resolution than the finite elements themselves. Indeed, only a handful of elements may be necessary in order to achieve realistic changes in expression and to produce highly detailed graphic results.

Figure 10:
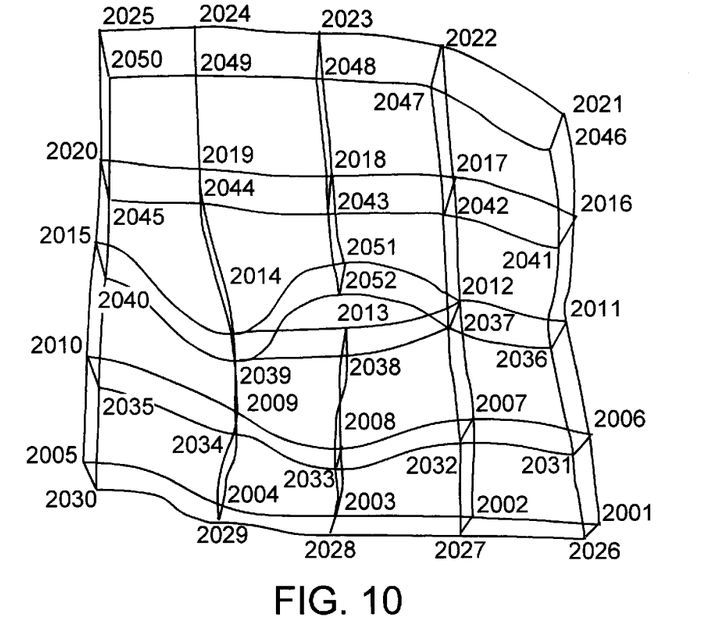
FIG. 10 illustrates a series of finite elements with labeled vertices (nodes) used in modeling a portion of the face including the left eye.
Figure 11:
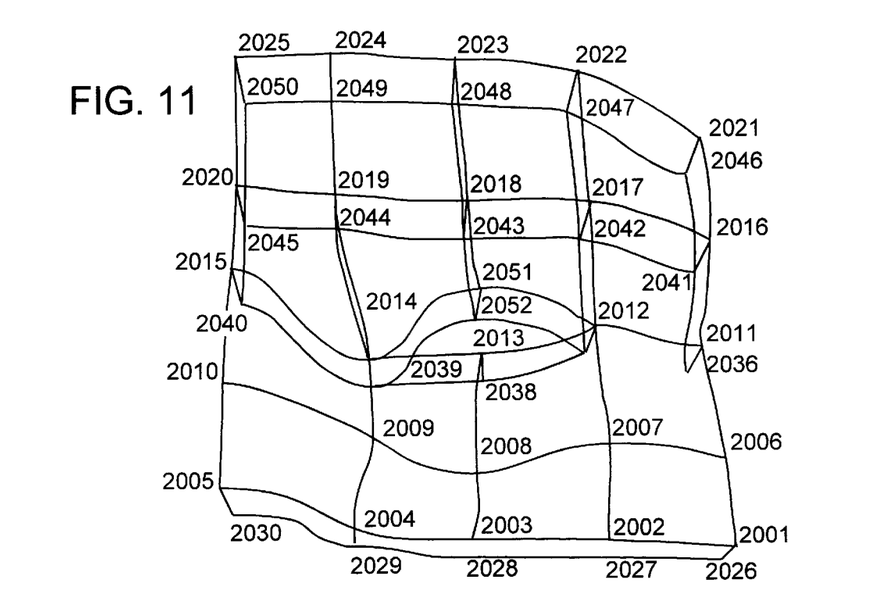
FIG. 11 illustrates the use of such elements in conjunction with the graphical representation generator for representation of skin over the lower portion of such region.
Figure 12:
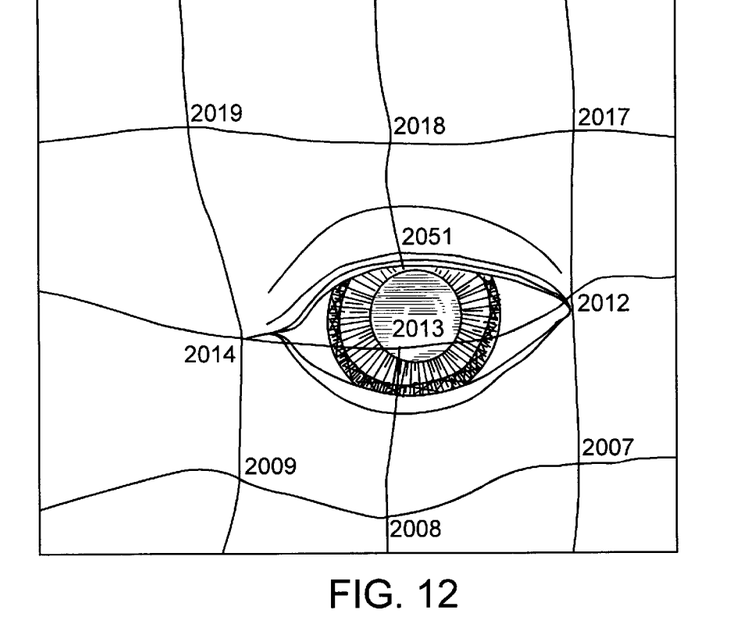
FIG. 12 illustrates use of such elements for representation of skin over the entire region.
Figure 13:
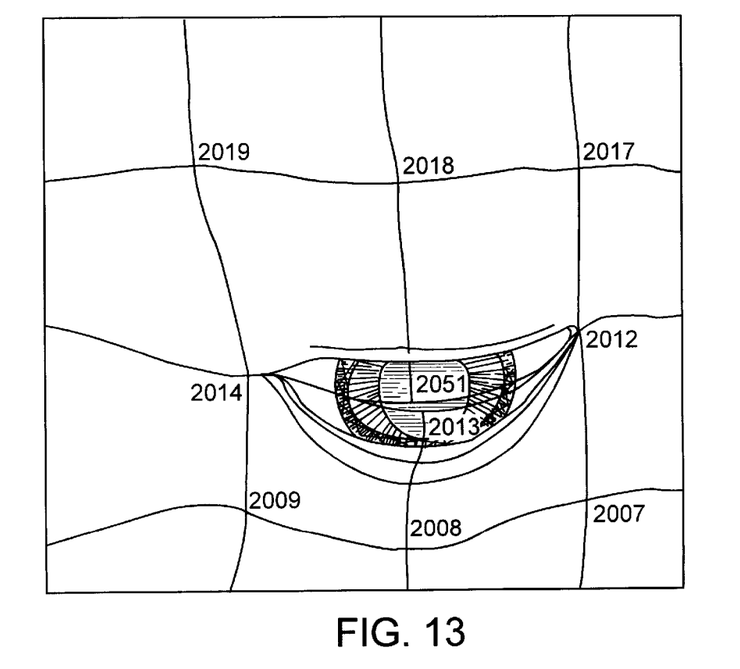
FIG. 13 illustrates operation of an embodiment of the invention with respect to the same region to represent a facial expression involving a partial wink.

In FIG. 10 is shown a layout of finite elements used for volumetric modeling of a portion of the face including the left eye. In this illustration, the vertices (nodes) are numbered. In FIG. 11 is illustrated the effects of adding the graphical representation of tissues supplied by the graphic representation generator 14 for the area surrounding the lower portion of the eye. In FIG. 12, the entire graphical representation of tissue has been supplied. Finally, FIG. 13, there is illustrated the effects of a partial wink. Here there has been generated expressive detail resulting in a wrinkle near the boundary of the lower eyelid. The wrinkle follows the stress contour as discussed above. It can be seen that in generation of the wrinkle, the wrinkles are not dependent on the finite element boundaries for resolution of detail. This is for the same reason that the graphical representation of tissue in general is not dependent on the finite elements for resolution. Here, wrinkle height is generally a function of the region experiencing the greatest deformation.

It will be appreciated that the foregoing modeling can be implemented as a temporal phenomenon, so that the expression realized (including the incorporation of wrinkles) may be represented as a time-varying phenomenon. Although the description herein has focused primarily on wrinkles, it is also a part of expression to utilize eye and brow movement, lid movement, and the movement of other anatomical features as a part of expression. In particular, the response of the eyes and associated facial features may be calculated to an inputted visual tracking target, taking into account the vestibular response to motions of the head.

In general, the present invention is capable of implementing virtually all of the expression characteristics identified, for example, in the Fagin reference. Indeed, the Fagin reference can be used a key to identifying expression characteristics that can be represented using the present invention, although the present invention is not limited to the range described in the Fagin reference.

Although the foregoing embodiments have utilized a distinct expressive detail generator, it will be appreciated that it is possible to utilize the finite element model itself in such a manner as to include the capability for expression generation. In this embodiment, as in the case of the embodiments above, the model has a data input for parameter values defining tissue properties for the particular system, a command input for identifying an expression to be represented, and a finite-element output specifying field values, associated with tissue of the system, in finite-element coordinates. In this embodiment, however, the model also has an arrangement providing a volumetric and anisotropic model of tissue that includes computation of a strain-related quantity for each of the plurality of finite elements configured so that tissue deformation may result in wrinkles associated with contours of the strain-related quantity. Finally, the apparatus of this embodiment includes a graphical representation generator, as described previously, implemented in a computer and coupled to the finite-element output for determining an isosurface of tissue of the system and providing a graphic output defining the isosurface in world coordinates.

What is claimed is:

1. Apparatus for representation of expression in a particular tissue-like system, the apparatus comprising:
   a. a finite-element model of a tissue-like system implemented in a computer, the model having
      i. a data input for parameter values defining tissue properties for the particular system;
      ii. a command input for identifying an expression to be represented; and
      iii. a finite-element output specifying field values, associated with tissue of the system, in finite-element coordinates;
   b. a graphical representation generator, implemented in a computer and coupled to the finite-element output, for determining a surface of tissue of the system and providing a graphic output defining the surface in world coordinates; and c. an expressive detail generator, implemented in a computer and coupled to the finite-element output, for generating expressive detail by modifying the surface determined by the graphical representation generator, wherein the expressive detail generator employs an anisotropic model of tissue, and a wrinkle generator, the wrinkle generator including:

i. an arrangement for computing a field of a strain-related quantity for each of a plurality of finite elements based on the finite-element output; and ii. an arrangement for modifying the surface of tissue as computed in the graphical representation generator in finite-element coordinates before the surface has been mapped into world coordinates;

so as to produce tissue surface modifications that are not limited to effects caused by movement of, and volume changes in, any underlying musculature.

2. Apparatus according to claim 1, wherein the finite-element model, the graphic representation generator, and the expressive detail generator are configured to provide time-varying outputs so that the graphic output represents an expression that is time-dependant.

3. Apparatus according to claim 1, wherein the tissue-like system has properties similar to those of collagen fibers in tissue and the anisotropic model is based principally on fiber direction associated with the tissue-like system.

4. Apparatus for representation of expression in a particular tissue-like system, the apparatus comprising:

a. a finite-element model of a tissue-like system, implemented in a computer, the model having
      i. a data input for parameter values defining tissue properties for the particular system;
      ii. a command input for identifying an expression to be represented;
      iii. a finite-element output specifying field values, associated with tissue of the system, in finite-element coordinates; and
      iv. an arrangement providing a volumetric and anisotropic model of tissue based principally on collagen fiber direction that includes computation of a field of a strain-related quantity for each of a plurality of finite elements, configured so that tissue deformation may result in wrinkles; and b. a graphical representation generator, implemented in a computer and coupled to the finite-element output, for determining a surface of tissue of the system and providing a graphic output defining the surface in world coordinates;

as to produce tissue surface modifications that are not limited to effects caused by movement of, or volume changes in, any underlying musculature.

5. Apparatus according to claim 4, wherein the tissue-like system has properties similar to those of collagen fibers in tissue and wherein the anisotropic model is based principally on fiber direction associated with the tissue-like system.

6. Method for representing expression in a tissue-like system pertaining to a particular subject, the method comprising:

a. generating a volumetric finite element mesh of the tissue-like system, the volumetric finite element mesh having elements and containing multiple fields of parameters definable across the elements including a height field;

b. measuring three-dimensional features of the particular subject;

c. fitting the volumetric finite element mesh to the three-dimensional features of the particular subject in terms of a fiber coordinate system;

d. calculating a wrinkle map characterizing the particular subject and having wrinkles;

e. isolating positions of the wrinkles into height fields of the finite element mesh; and f. converting tissue compression based on command data or stored data to the fiber coordinate system; and g. calculating displacement magnitudes of the height field;

so as to produce tissue surface modifications that are not limited to effects caused by movement of, or volume changes in, any underlying musculature.

7. A method according to claim 6, further including the step of displaying the calculated displacement magnitudes.

* * * * *